US010889185B2

(12) United States Patent
Itoo et al.

(10) Patent No.: US 10,889,185 B2
(45) Date of Patent: Jan. 12, 2021

(54) DRIVE SWITCHING MECHANISM OF UTILITY VEHICLE (71) Applicant: KAWASAKI JUKOGYO KABUSHIKI KAISHA, Hyogo (JP)

(72) Inventors: Seiji Itoo, Hyogo (JP); Ayumi Hamada, Hyogo (JP); Manabu Hidaka, Hyogo (JP); Masahiko Nakagawa, Hyogo (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 78 days.

(21) Appl. No.: 16/205,652

(22) Filed: Nov. 30, 2018

(65) Prior Publication Data
US 2020/0172103 A1 Jun. 4, 2020

(51) Int. Cl.
B60W 10/119 (2012.01)
B60K 23/08 (2006.01)
(Continued)

(52) U.S. Cl.
CPC ......... *B60K 23/0808* (2013.01); *B60W 10/06* (2013.01); *B60W 10/119* (2013.01); *B60W 10/14* (2013.01); *B60W 10/16* (2013.01); *F16H 48/24* (2013.01); *B60K 23/04* (2013.01); *B60K 2023/046* (2013.01); *B60W 30/19* (2013.01); *B60W 2510/0208* (2013.01);
(Continued)

(58) Field of Classification Search
CPC ........... Y10T 477/679; Y10T 677/6808; F16H 2048/343; F16H 48/24; B60W 10/16; B60W 10/06; B60W 10/119; B60W 2510/0283; B60W 2510/0208; B60W 2710/021; B60W 2710/125; B60W 2510/12; B60W 10/14; B60W 30/19; B60K 23/0808; F16D 2500/10431; F16D 2500/30415; F16D 2500/30816; F16D 2500/70424; F16D 2500/25; F16D 2500/30426; F16D 2500/30401; F16D 2500/3108; F16D 2500/10462
See application file for complete search history.

(56) References Cited

U.S. PATENT DOCUMENTS 4,889,204 A * 12/1989 Furuya ............... B60K 23/0808
180/197
6,001,041 A * 12/1999 Sawase ............. B60K 17/3462
475/198

(Continued)

FOREIGN PATENT DOCUMENTS

WO WO-2014031158 A1 * 2/2014 ............ B60W 10/06

*Primary Examiner* — Roger L Pang
(74) *Attorney, Agent, or Firm* — Wenderoth, Lind & Ponack, L.L.P.

(57) ABSTRACT

A drive switching mechanism of a utility vehicle includes: a two-wheel drive and four-wheel drive switching device that switches between two-wheel drive and four-wheel drive of the utility vehicle; and a control unit that controls the drive switching mechanism. The two-wheel drive and four-wheel drive switching device switches between two-wheel drive and four-wheel drive by using a first clutch. The control unit permits the two-wheel drive and four-wheel drive switching device to switch from two-wheel drive to four-wheel drive when a rotation difference of the first clutch becomes equal to or smaller than a predetermined value.

7 Claims, 10 Drawing Sheets (51) Int. Cl.

| | |
|---|---|
| *B60W 10/06* | (2006.01) |
| *F16H 48/24* | (2006.01) |
| *B60W 10/16* | (2012.01) |
| *B60W 10/14* | (2012.01) |
| *F16D 11/14* | (2006.01) |
| *B60K 23/04* | (2006.01) |
| *B60W 30/19* | (2012.01) |
| *F16H 48/34* | (2012.01) |

(52) U.S. Cl.
CPC . *B60W 2510/0283* (2013.01); *B60W 2510/12* (2013.01); *B60W 2520/10* (2013.01); *B60W 2710/021* (2013.01); *B60W 2710/125* (2013.01); *F16D 11/14* (2013.01); *F16D 2500/10431* (2013.01); *F16D 2500/10462* (2013.01); *F16D 2500/30401* (2013.01); *F16D 2500/30415* (2013.01); *F16D 2500/30426* (2013.01); *F16D 2500/30816* (2013.01); *F16D 2500/3108* (2013.01); *F16D 2500/70424* (2013.01); *F16H 2048/343* (2013.01); *Y10T 477/679* (2015.01); *Y10T 477/6808* (2015.01)

(56) References Cited

U.S. PATENT DOCUMENTS

| | | |
|---|---|---|
| 8,870,702 B2 | 10/2014 | Kii et al. |
| 2015/0328983 A1* | 11/2015 | Takaira ................ B60K 17/354 |
| | | 180/233 |
| 2019/0195291 A1* | 6/2019 | Eisl ......................... F16D 11/14 |

* cited by examiner

Fig.10

DRIVE SWITCHING MECHANISM OF UTILITY VEHICLE

BACKGROUND OF THE INVENTION

Field of the Invention

The present invention relates to a drive switching mechanism of a utility vehicle.

Description of the Related Art

As disclosed in the description of U.S. Pat. No. 8,870,702, a conventional utility vehicle includes a two-wheel drive and four-wheel drive switching device which switches between two-wheel drive and four-wheel drive, and a differential lock device for controlling fixation and release of a differential device which distributes and transmits a driving force to left and right wheels.

SUMMARY OF THE INVENTION

For switching between two-wheel drive and four-wheel drive or between fixation and release of the differential device by using a dog clutch, it is generally recommended to carry out these switching during a stop of the utility vehicle to smoothly switch the dog clutch.

Accordingly, it is an object of the present invention to provide a drive switching mechanism of a utility vehicle, which is a mechanism capable of smoothly achieving drive switching even during running of the utility vehicle.

For achieving the above object, a drive switching mechanism of a utility vehicle according to a first aspect of the present invention includes: a two-wheel drive and four-wheel drive switching device that switches between two-wheel drive and four-wheel drive of the utility vehicle; and a control unit that controls the drive switching mechanism. The two-wheel drive and four-wheel drive switching device switches between two-wheel drive and four-wheel drive by using a first clutch. The control unit permits the two-wheel drive and four-wheel drive switching device to switch from two-wheel drive to four-wheel drive when a rotation difference of the first clutch becomes equal to or smaller than a predetermined value.

According to the above configuration, switching from two-wheel drive to four-wheel drive is permitted after the rotation difference of the first clutch becomes equal to or smaller than a predetermined value. Accordingly, switching by a clutch is smoothly achievable.

It is preferable that the first aspect further includes following configurations.

(1) The two-wheel drive and four-wheel drive switching device fixes a propeller shaft to an input pinion of a final reduction device.

The control unit calculates the rotation difference of the first clutch by using a vehicle speed sensor that detects rotation of a gear included in a transmission and rotating with the propeller shaft, and a ring gear rotation sensor that detects rotation of a ring gear that rotates with the input pinion.

(2) The control unit instantaneously increases or decreases an output of an engine of the utility vehicle at disconnection of the first clutch.

According to the configuration (1), the rotation speed of the driving side of the first clutch is detected by using the vehicle speed sensor, and the rotation speed of the driven side of the first clutch is detected by using the ring gear rotation sensor. Accordingly, the rotation difference of the first clutch can be easily calculated.

According to the configuration (2), the control unit instantaneously increases or decreases the output of the engine, and thereby causes oscillation of the vehicle body and produces an instant for releasing torque. Accordingly, disconnection of the first clutch is easily achievable.

A drive switching mechanism of a utility vehicle according to a second aspect of the present invention includes: a differential lock device that controls fixation and release of a differential device that distributes and transmits a driving force to left and right wheels; and a control unit that controls the drive switching mechanism. The differential lock device is configured to switch between fixation and release of the differential device by using a second clutch. The control unit permits the differential lock device to fix the differential device when a rotation difference of the second clutch becomes equal to or smaller than a predetermined value.

According to the above configuration, fixation of the differential device by the differential lock device is permitted after the rotation difference of the second clutch becomes equal to or smaller than a predetermined value. Accordingly, switching by the clutch is smoothly achievable.

It is preferable that the second aspect further includes following configurations.

(3) The differential lock device is configured to fix an axle on one of left and right sides to a differential case of the differential device.

The control unit calculates the rotation difference of the second clutch by using a ring gear rotation sensor that detects rotation of a ring gear rotating with the differential case, and an axle sensor that detects rotation of the axle on the one side.

(4) The control unit instantaneously increases or decreases an output of an engine of the utility vehicle when the second clutch is disconnected.

According to the configuration (3), the rotation speed of the driving side of the second clutch is detected by using the ring gear rotation sensor, and the rotation speed of the driven side of the second clutch is detected by using the axle sensor on the one side. Accordingly, the rotation difference of the second clutch can be easily calculated.

According to the configuration (4), the control unit instantaneously increases or decreases the output of the engine, and thereby causes oscillation of the vehicle body and produces an instant for releasing torque. Accordingly, disconnection of the second clutch is easily achievable.

In short, according to the present invention, a drive switching mechanism of a utility vehicle capable of smoothly achieving drive switching even during running of the utility vehicle is provided.

DETAILED DESCRIPTION OF THE PREFERRED EMBODIMENTS

A utility vehicle including a drive switching mechanism according to an embodiment of the present invention will be hereinafter described with reference to the accompanying drawings. Utility vehicles are vehicles chiefly for traveling not only on grasslands, gravels, and sandy areas, but also on off-road such as unpaved mountain paths and forest roads, muds and rocky areas. For convenience of explanation, it is assumed in following description that a traveling direction of the utility vehicle corresponds to a "front" of the utility vehicle and respective components, and that left and right in a vehicle width direction as viewed from an occupant facing the front on the utility vehicle correspond to "left and right" of the utility vehicle and respective components.

[General Structure of Vehicle]

Figure 1:
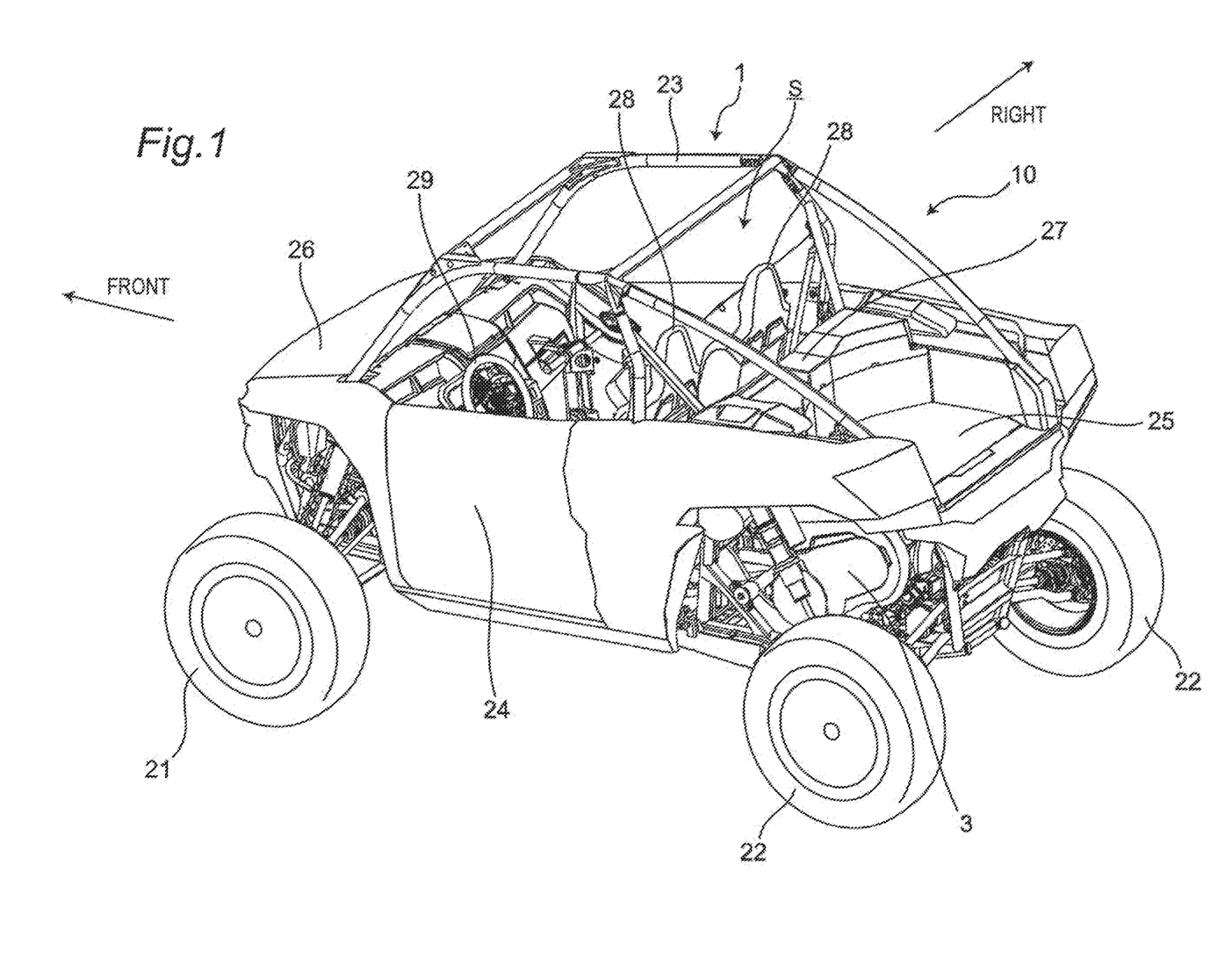
FIG. 1 is a perspective view of a utility vehicle including a drive switching mechanism according to an embodiment of the present invention.
Figure 2:
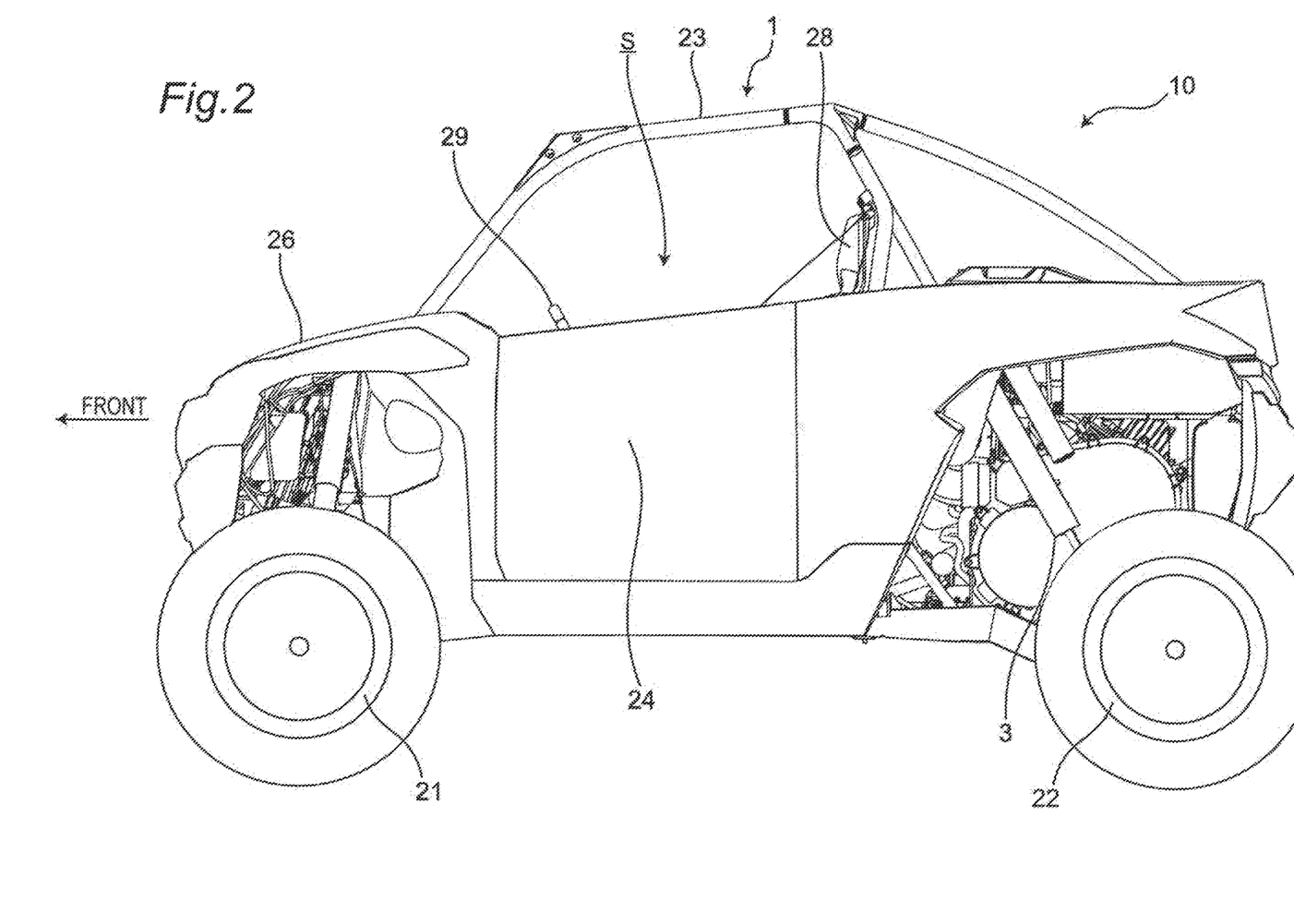
FIG. 2 is a left side view of the utility vehicle in FIG. 1.

FIG. 1 is a perspective view of a utility vehicle including a drive switching mechanism according to an embodiment of the present invention, while FIG. 2 is a left side view of the utility vehicle in FIG. 1.

As shown in FIGS. 1 and 2, a utility vehicle 10 includes a pair of left and right front wheels 21 in a front region of a vehicle body, a pair of left and right rear wheels 22 in a rear region of the vehicle body, and a boarding space (cabin) S between the front wheels 21 and the rear wheels 22. The boarding space S is surrounded by a ROPS 23 and a pair of left and right doors 24. The ROPS is an abbreviation of a rollover protective structure, and constitutes a part of a body frame 1.

A cargo bed 25 is provided behind the boarding space S, while a bonnet 26 is provided in front of the boarding space S. A back panel 27 which separates the cargo bed 25 from the boarding space S is further provided at a front end of the cargo bed 25.

A pair of left and right independent seats 28 are disposed in the boarding space S. An operation unit such as a steering wheel 29 is provided in front of the seat 28.

Figure 3:
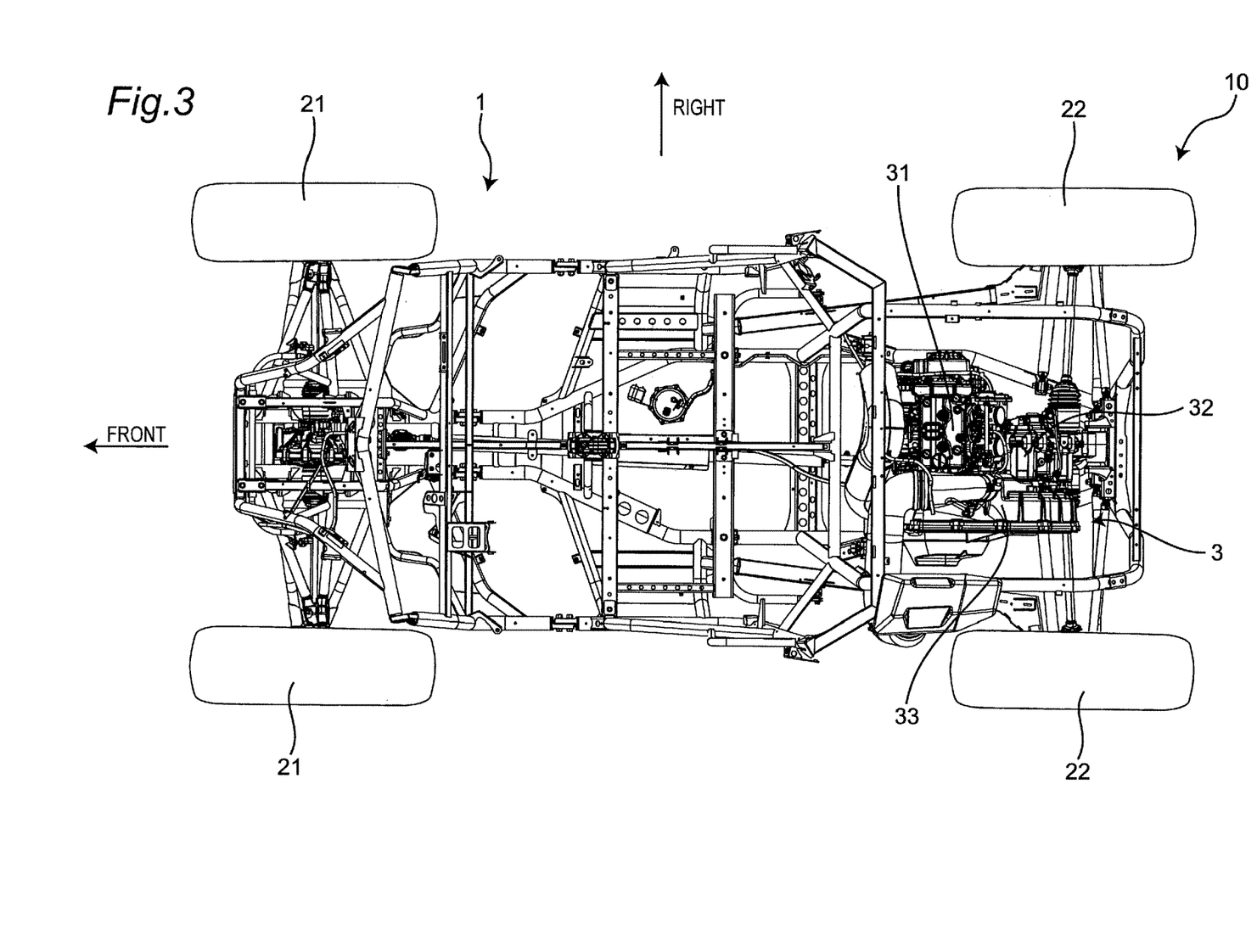
FIG. 3 is a top view showing an arrangement of a power unit.
Figure 4:
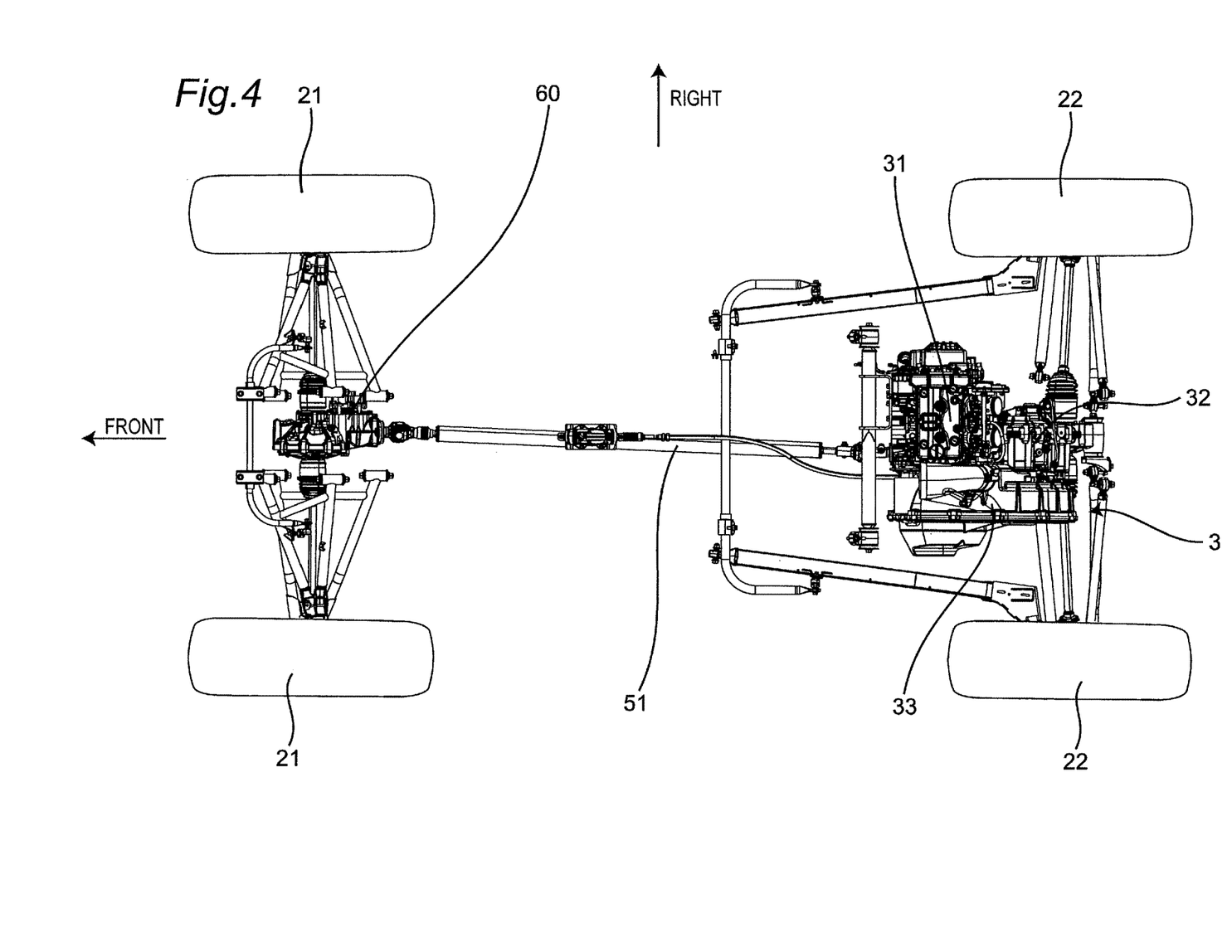
FIG. 4 is a top view showing a driving force transmission path of the power unit.
Figure 5:
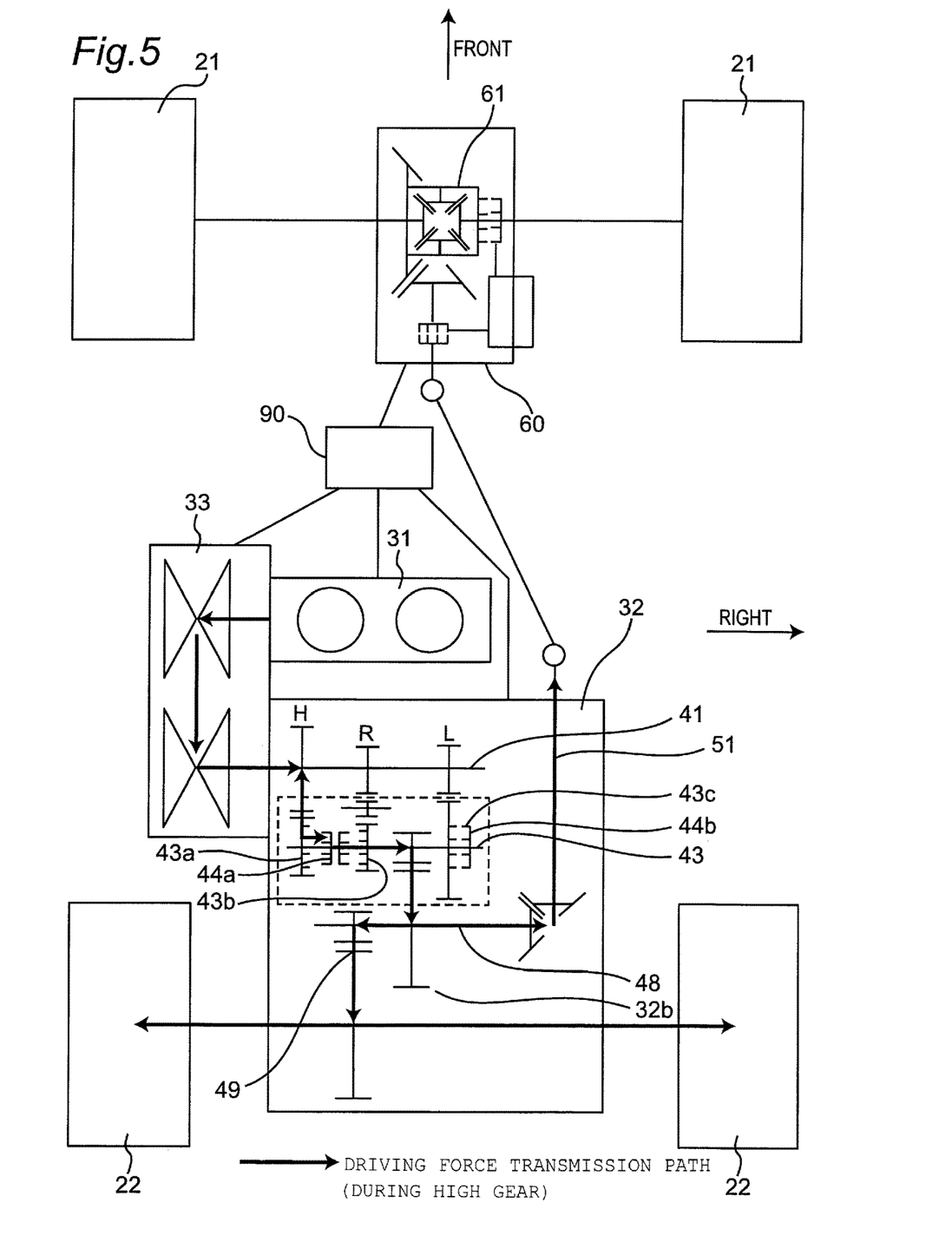
FIG. 5 is a schematic diagram describing the driving force transmission path of the power unit.

A power unit 3 is provided below the cargo bed 25. FIG. 3 is a top view showing an arrangement of the power unit 3, while FIG. 4 is a top view showing a driving force transmission path of the power unit 3. FIG. 5 is a schematic diagram describing the driving force transmission path of the power unit 3. As shown in FIGS. 3 to 5, the power unit 3 includes an engine 31, a transmission 32 disposed behind the engine 31, a V-belt type continuously variable transmission 33 disposed on the left side of the engine 31 and the transmission 32. A driving force of the engine 31 is transmitted to the transmission 32 via the continuously variable transmission 33. The transmission 32 transmits the driving force to the pair of left and right front wheels 21 and the pair of left and right rear wheels 22. The utility vehicle 10 further includes a control unit 90 for controlling each of devices provided in the driving force transmission path.

[Transmission]

Figure 6:
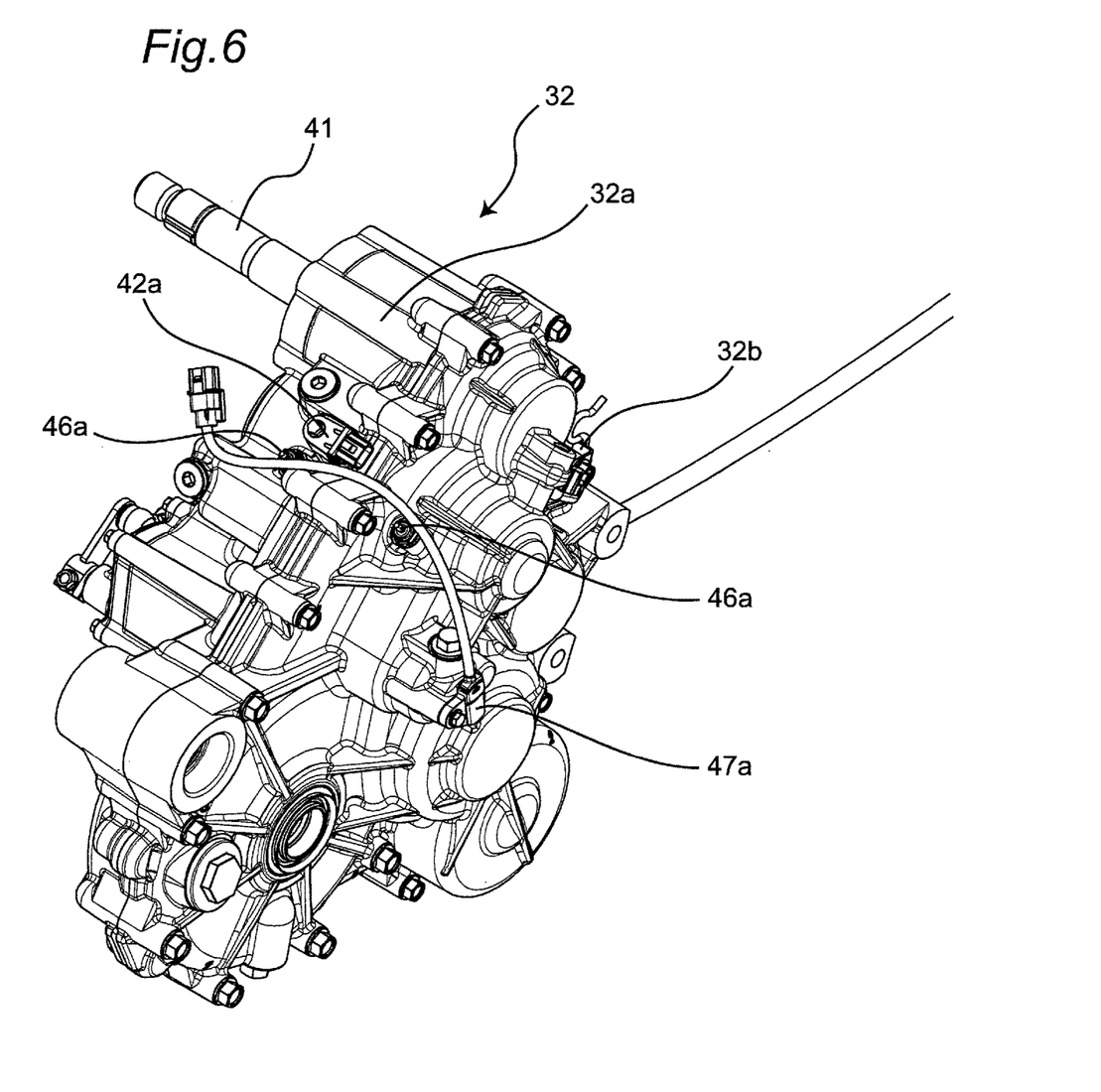
FIG. 6 is a perspective view of a transmission.
Figure 7:
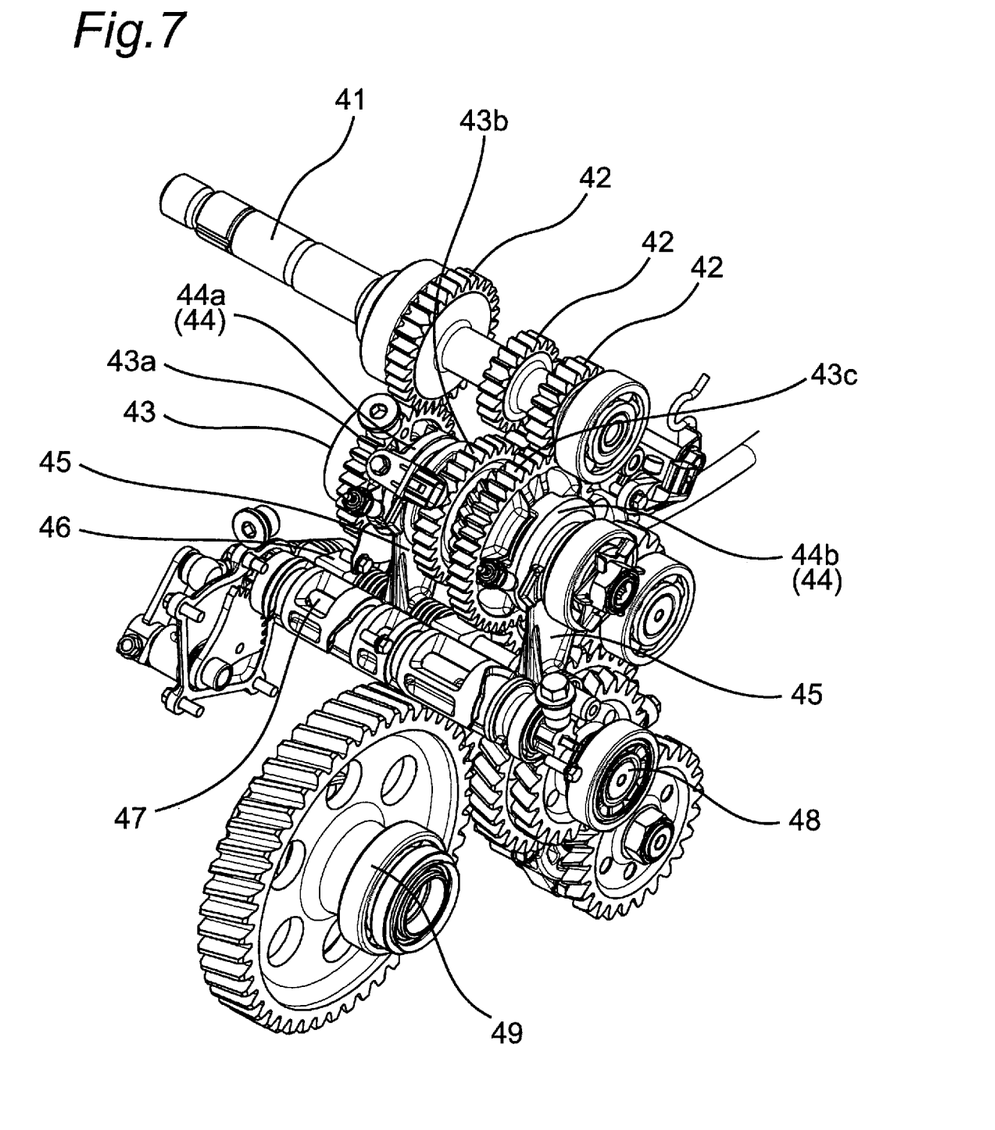
FIG. 7 is a perspective view of the transmission from which a transmission cover has been removed.
Figure 8:
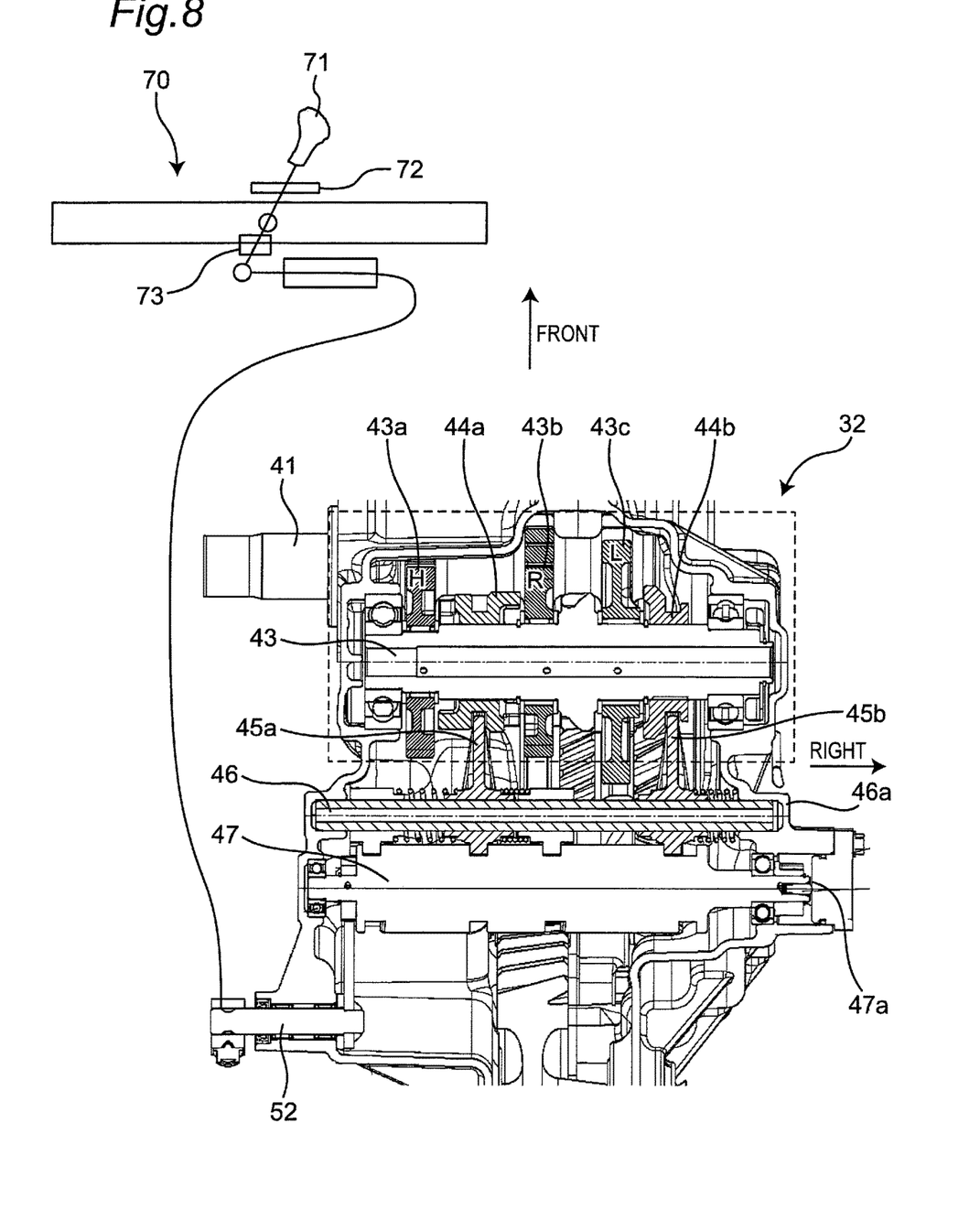
FIG. 8 is a schematic diagram showing a driving force transmission path in the transmission.

FIG. 6 is a perspective view of the transmission 32, while FIG. 7 is a perspective view of the transmission 32 from which a transmission cover 32a has been removed. FIG. 8 is a schematic diagram showing a driving force transmission path in the transmission 32. As shown in FIGS. 6 to 8, the transmission 32 includes an input shaft 41 to which the driving force from the continuously variable transmission 33 is input, an input gear 42 connected to the input shaft 41, a counter shaft 43, a shifter 44 connected to the counter shaft 43 that transmits the driving force of the input shaft 41, and enabling engagement between the input gear 42 and gears 43a, 43b, and 43c connected to the counter shaft 43, a shift shaft 46 receiving attachment of a shift fork 45 which moves the shifter 44 to achieve engagement between the input gear 42 and the gears 43a, 43b, 43c connected to the counter shaft 43, a shift drum 47 which rotationally moves the shift fork 45, a front wheel output shaft 48 to which a driving force of the counter shaft 43 is transmitted, and a rear wheel final reduction device 49 to which a driving force is transmitted from the front wheel output shaft 48. Connection includes not only direct connection, but also indirect connection via other components. An input side rotation sensor 42a which detects a rotation speed of the input gear 42 is provided on the transmission cover 32a near the input shaft 41. The driving force transmitted to the rear wheel final reduction device 49 is directly transmitted to the left and right rear wheels 22, or distributed and transmitted to the left and right rear wheels 22 by using a differential device.

The shifter 44 includes a first shifter 44a engaging with a high gear 43a or a reverse gear 43b of the counter shaft 43 engaging with the input gear 42, and a second shifter 44b engaging with a low gear 43c of the counter shaft 43. The shift fork 45 includes a first shift fork 45a engaging with the first shifter 44a, and a second shift fork 45b engaging with the second shifter 44b. A vehicle speed sensor 32b is provided on the transmission cover 32a to detect a vehicle speed for the gear connected to the front wheel output shaft 48. The rotation speed of the shifter 44 is calculated by the vehicle speed sensor 32b.

With a predetermined rotation of the shift drum 47, the first shift fork 45a moves in the axial direction, and the first shifter 44a engaging with the first shift fork 45a simultaneously moves in the axial direction. When the first shifter 44a moves to the left and brings a left end of the first shifter 44a and the high gear 43a into engagement, the rotation of the high gear 43a is transmitted to the counter shaft 43 via the first shifter 44a. When the first shifter 44a moves to the right and brings a right end of the first shifter 44a and the reverse gear 43b into engagement, the rotation of the reverse gear 43b is transmitted to the counter shaft 43 via the first shifter 44a. Moreover, with a predetermined rotation of the shift drum 47, the second shift fork 45b moves in the axial direction, and the second shifter 44b engaging with the second shift fork 45b simultaneously moves in the axial direction. When the second shifter 44b moves to the left and brings a left end of the second shifter 44b and the low gear 43c into engagement, the rotation of the low gear 43c is transmitted to the counter shaft 43 via the second shifter 44b. The driving force transmitted from the high gear 43a, the reverse gear 43b or the low gear 43c to the counter shaft 43 is transmitted to the rear wheels 22 via the rear wheel final reduction device 49, and to the front wheels 21 via the front wheel output shaft 48. FIG. 5 shows a path through which the driving force of the input gear 42 is transmitted to the rear wheels 22, or the rear wheels 22 and the front wheels 21 via the high gear 43a of the counter shaft 43.

A phase detection sensor 47a which detects a rotational phase of the shift drum 47 is attached to the transmission cover 32a near the shift drum 47. A position detection switch 46a which detects movement of the shift fork 45 to a position of engagement between the shifter 44 and the input gear 42, that is, completion of movement of the shift fork 45, is attached to the transmission cover 32a near the shift shaft 46.

A front wheel propeller shaft 51 extending toward the front is connected to a right end of the front wheel output shaft 48, while a front wheel final reduction device 60 is connected to a front end of the front wheel propeller shaft 51. A driving force of the front wheel output shaft 48 is transmitted to the front wheel final reduction device 60 via the front wheel propeller shaft 51. The driving force transmitted to the front wheel final reduction device 60 is distributed and transmitted to the left and right front wheels 21 by a differential device 61.

[Front Wheel Final Reduction Device]

Figure 9:
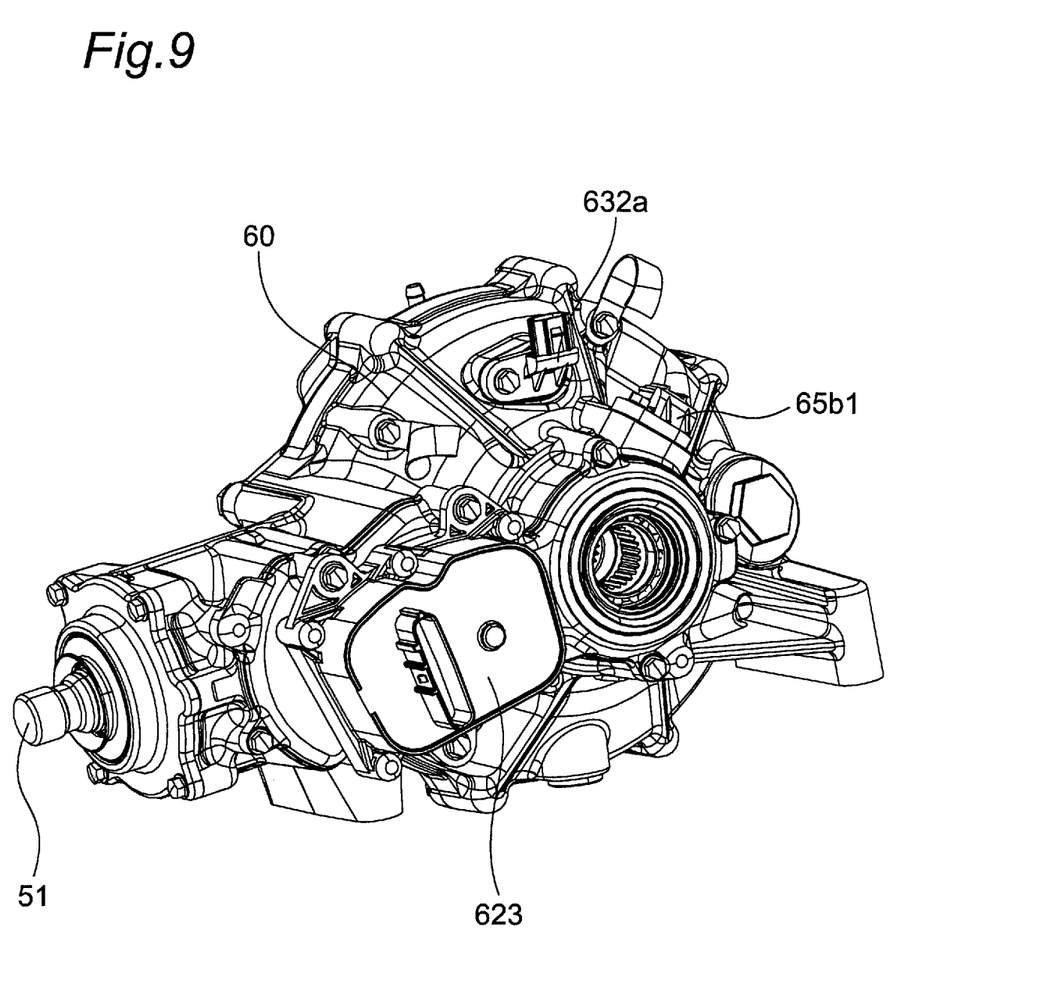
FIG. 9 is a perspective view of a front wheel final reduction device.
Figure 10:
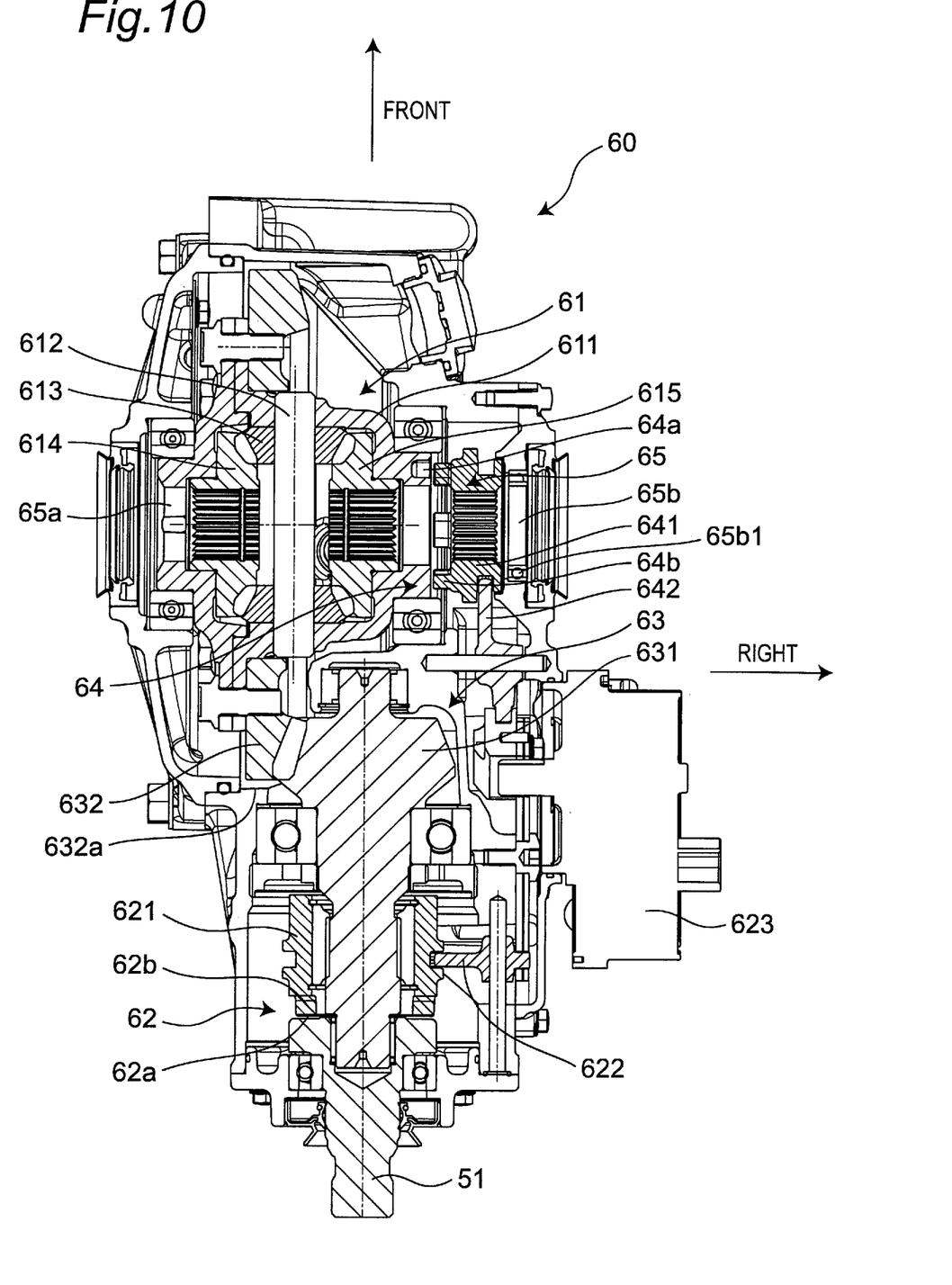
FIG. 10 is a cross-sectional view of the front wheel final reduction device.

FIG. 9 is a perspective view of the front wheel final reduction device 60, while FIG. 10 is a cross-sectional view of the front wheel final reduction device 60. As shown in FIGS. 9 and 10, a two-wheel drive and four-wheel drive switching mechanism 62, a final reduction gear mechanism 63, a differential device 61, and a differential lock device 64 are provided inside a case of the front wheel final reduction device 60. The drive switching mechanism carries out switching between two-wheel drive and four-wheel drive by using the two-wheel drive and four-wheel drive switching mechanism 62, and locking and unlocking of the differential device 61 by using the differential lock device 64.

The two-wheel drive and four-wheel drive switching mechanism 62 includes driving dog teeth 62a and driven dog teeth 62b (first clutch). The driven dog teeth 62b are provided on a shift sleeve 621. The shift sleeve 621 is driven by a shift fork 622 which engages the shift sleeve 621. The shift fork 622 is driven by a motor actuator 623.

The driving dog teeth 62a are provided at a front end of the front wheel propeller shaft 51.

When the shift fork 622 is driven by the motor actuator 623 and brings the driven dog teeth 62b of the shift sleeve 621 into engagement with the driving dog teeth 62a of the front wheel propeller shaft 51, the two-wheel drive and four-wheel drive switching mechanism 62 comes into a four-wheel drive state. When the shift fork 622 is driven by the motor actuator 623 and disconnects the driven dog teeth 62b of the shift sleeve 621 from the driving dog teeth 62a of the front wheel propeller shaft 51, the two-wheel drive and four-wheel drive switching mechanism 62 comes into a two-wheel drive state.

The final reduction gear mechanism 63 has an input pinion 631 extending in the front-rear direction and a ring gear 632 having a large diameter. A rear end of the input pinion 631 is spline-fitted to the shift sleeve 621.

The ring gear 632 is a bevel gear which is connected to a differential case 611 of the differential device 61 and rotates around a front axle 65 with the differential case 611 as one body. A ring gear rotation sensor 632a which detects a rotation speed of the ring gear 632 is provided in a case of the front wheel final reduction device 60 near the ring gear 632. The ring gear may be a helical gear or a spur gear rather than a bevel gear.

The differential device 61 includes the differential case 611, a support shaft 612 fixed to the differential case 611, a pair of differential gears 613 rotatably supported by the support shaft 612, a left side gear 614 and a right side gear 615 respectively engaging with the corresponding differential gears 613. A left front axle 65a is spline-fitted to the left side gear 614, while a right front axle 65b is spline-fitted to the right side gear 615.

The differential lock device 64 fixes or releases the differential device 61 by fixing or releasing the differential case 611 and the right front axle 65b. The differential lock device 64 includes driving dog teeth 64a and driven dog teeth 64b (second clutch). The driven dog teeth 64b are provided on a shift sleeve 641. The shift sleeve 641 is driven by a shift fork 642 engaging with the shift sleeve 641. The shift fork 642 is driven by a motor actuator 623. The right front axle 65b is spline-fitted to the shift sleeve 641. An axle sensor 65b1 which detects a rotation speed of the right front axle 65b is provided in the case of the front wheel final reduction device 60 near the right front axle 65b.

The driving dog teeth 64a are formed in the differential case 611.

When the shift fork 642 is driven by the motor actuator 623 and brings the driven dog teeth 64b of the shift sleeve 641 into engagement with the driving dog teeth 64a of the differential case 611, the right front axle 65b is fixed to the differential case 611 and comes into a locked state. When the shift fork 642 is driven by the motor actuator 623 and disconnects the driven dog teeth 64b of the shift sleeve 641 from the driving dog teeth 64a of the differential case 611, the right front axle 65b is disconnected from the differential case 611 and comes into an unlocked state.

The drive switching mechanism of the utility vehicle 10 operates in a following manner.

When the utility vehicle 10 is in the two-wheel drive state, the control unit 90 detects rotation of the driving dog teeth 62a by using the vehicle speed sensor 32b, and detects rotation of the driven dog teeth 62b by using the ring gear rotation sensor 632a in response to a press to a two-wheel drive and four-wheel drive switching button by the driver. When a rotation difference between the driving dog teeth 62a and the driven dog teeth 62b becomes equal to or smaller than a predetermined value, the control unit 90 permits switching from the two-wheel drive to four-wheel drive.

When the control unit 90 permits switching from two-wheel drive to four-wheel drive, the motor actuator 623 operates and moves the shift fork 622. With movement of the shift fork 622, the shift sleeve 621 engaging with the shift fork 622 moves. As a result, the driven dog teeth 62b of the shift sleeve 621 engage with the driving dog teeth 62a of the front wheel propeller shaft 51, achieving a four-wheel drive state.

When the driver pushes a differential lock button in a state that the right front axle 65b is disconnected from the differential case 611 and comes into the unlocked state in the utility vehicle 10, the control unit 90 detects rotation of the driving dog teeth 64a by using the ring gear rotation sensor 632a, and detects rotation of the driven dog teeth 64b by using the axle sensor 65b1. When a rotation difference between the driving dog teeth 64a and the driven dog teeth 64b becomes equal to or smaller than a predetermined value, the control unit 90 permits the right front axle 65b to switch from the unlocked state to the locked state.

When the control unit 90 permits the right front axle 65b to switch from the unlocked state to the locked state, the motor actuator 623 operates and moves the shift fork 642. When the shift sleeve 641 engaging with the shift fork 642 moves in accordance with the movement of the shift fork 642, and brings the driven dog teeth 64b of the shift sleeve 641 into engagement with the driving dog teeth 64a of the differential case 611, the right front axle 65b is fixed to the differential case 611 and comes into a locked state.

According to the drive switching mechanism having the above configuration, following effects are offered.

(1) When the rotation difference between the first clutch (driving dog teeth 62a and driven dog teeth 62b) becomes equal to or smaller than a predetermined value, the control unit 90 permits the two-wheel drive and four-wheel switching device to switch from two-wheel drive to four-wheel drive. Accordingly, switching by the dog clutch is smoothly achievable.

(2) The control unit 90 detects the rotation speed of the driving dog teeth 62a of the first clutch by using the vehicle speed sensor 32b, and detects the rotation speed of the driven dog teeth 62b of the first clutch by using the ring gear rotation sensor 632a. Accordingly, the rotation difference of the first clutch can be easily calculated.

(3) The control unit 90 permits fixation of the differential device 61 by the differential lock device 64 after the rotation difference of the second clutch (driving dog teeth 64a and driven dog teeth 64b) becomes equal to or smaller than a predetermined value. Accordingly, switching by dog clutch is smoothly achievable.

(4) The control unit 90 detects the rotation speed of the driving dog teeth 64a of the second clutch by using the ring gear rotation sensor 632a, and detects the rotation speed of the driven dog teeth 64b of the second clutch by using the axle sensor 65b1 of the right front axle 65b. Accordingly, the rotation difference of the second clutch can be easily calculated.

The first clutch (driving dog teeth 62a and driven dog teeth 62b) and the second clutch (driving dog teeth 64a and driven dog teeth 64b) of the drive switching mechanism of the above embodiment are switched via dog engagement. However, switching may be achieved via spline-engagement.

In the above embodiment, the vehicle speed sensor 32b is provided on the gear connected to the front wheel output shaft 48. However, the vehicle speed sensor 32b may be provided on a gear that rotates at the same speed as the rotation speed of the counter shaft 43, or may be provided on the rear wheel final reduction device 49 or the front wheel final reduction device 60. The vehicle speed sensor 32b may be of any types as long as a rotation speed of a target can be detected for calculation of a vehicle speed. In the present embodiment, for example, the vehicle speed sensor 32b may be a sensor which detects a rotation speed of the counter shaft 43 or of a rotation shaft on the downstream side of the counter shaft 43 in the driving force transmission direction, or may be a sensor which detects a rotation speed of the front wheel output shaft 48. When the front wheel final reduction device 60 has a differential lock mechanism, the vehicle speed sensor provided on the front wheel final reduction device 60 is disposed on a ring gear or on a shifter (shift sleeve) of the differential lock mechanism.

In the above embodiment, the ring gear rotation sensor 632a is provided near the ring gear 632. However, the ring gear rotation sensor 632a may be of any types as long as the rotation speed of the ring gear 632 can be detected. In the present embodiment, for example, the ring gear rotation sensor 632a may be a sensor which detects a rotation speed of a part rotating with the ring gear 632 as one body, such as the differential case 611. Alternatively, instead of the rotation speed of the ring gear 632, an average rotation speed between the rotation speed of the left front axle 65a and the rotation speed of the right front axle 65b is calculated and then based on the average rotation speed of the both axles, the rotation speed of the driven side of the first clutch or the rotation speed of the driving side of the second clutch may be detected.

In the above embodiment, the axle sensor 65b1 is provided near the right front axle 65b. However, the axle sensor 65b1 is only required to detect the rotation speed of the axle fixed to the differential case 611 of the differential device 61 by the differential lock device 64. In the present embodiment, for example, the axle sensor 65b1 may be any types of sensor which detects the rotation speed of the right front wheel, the shifter of the differential lock mechanism, or others rotating with the right front axle 65b as one body.

When the dog clutches (first clutch and second clutch) are disconnected, the control unit 90 may instantaneously increase or decrease the output of the engine 31, and thereby cause oscillation of the vehicle body and produce an instant for releasing torque to facilitate disconnection between the dog clutches. Control performed by the control unit 90 is applicable to clutches produced by spline-coupling.

In the above embodiment, the differential lock device 64 is provided on the front wheel final reduction device 60. However, the differential lock device may be provided on the rear wheel final reduction device 49, or may be provided on both the front wheel final reduction device 60 and the rear wheel final reduction device 49.

Various modifications and changes can be made without departing from the spirit and scope of the present invention described in the appended claims.

What is claimed is:

1. A drive switching mechanism of a utility vehicle, the drive switching mechanism comprising:
    a two-wheel drive and four-wheel drive switching device that switches between two-wheel drive and four-wheel drive of the utility vehicle; and
    a control unit that controls the drive switching mechanism, wherein:
    the two-wheel drive and four-wheel drive switching device switches between two-wheel drive and four-wheel drive by using a first clutch;
    the control unit permits the two-wheel drive and four-wheel drive switching device to switch from two-wheel drive to four-wheel drive when a rotation difference of the first clutch becomes equal to or smaller than a predetermined value;
    the two-wheel drive and four-wheel drive switching device fixes a propeller shaft to an input pinion of a final reduction device; and
    the control unit calculates the rotation difference of the first clutch by using a vehicle speed sensor that detects rotation of a gear included in a transmission and rotating with the propeller shaft, and a ring gear rotation sensor that detects rotation of a ring gear rotating with the input pinion.

2. The drive switching mechanism according to claim 1, wherein the control unit instantaneously increases or decreases an output of an engine of the utility vehicle when the first clutch is disconnected.

3. A drive switching mechanism of a utility vehicle, the drive switching mechanism comprising:
    a drive switching device that switches a drive condition of the utility vehicle by a clutch; and
    a control unit that controls the drive switching mechanism, wherein:
    the drive switching device switches a plurality of drive conditions by using the clutch;
    the control unit permits the drive switching device to switch a drive condition when a rotation difference of the clutch becomes equal to or smaller than a predetermined value;
    the drive switching device fixes a propeller shaft to an input pinion of a final reduction device; and
    the control unit calculates the rotation difference of the clutch by using a vehicle speed sensor that detects rotation of a gear included in a transmission and rotating with the propeller shaft, and a ring gear rotation sensor that detects rotation of a ring gear rotating with the input pinion.

4. The drive switching mechanism according to claim 3, wherein the control unit instantaneously increases or decreases an output of an engine of the utility vehicle when the clutch is disconnected.

5. The drive switching mechanism according to claim 3, wherein the drive switching device is provided at a front end of a front wheel propeller shaft.

6. The drive switching mechanism according to claim 3, wherein the drive switching device is provided inside a case of a final reduction device.

7. The drive switching mechanism according to claim 3, wherein the drive switching mechanism includes a plurality of the drive switching devices and all the drive switching devices are operated to change a drive condition by the same motor actuator.

\* \* \* \* \*